INVENTORS
RUDOLF R. SCHINDLER
RALPH D. ADAMS

BY Forrest J. Lilly

ATTORNEY

INVENTORS
RUDOLF R. SCHINDLER
RALPH D. ADAMS
BY Forrest J. Lilly
ATTORNEY

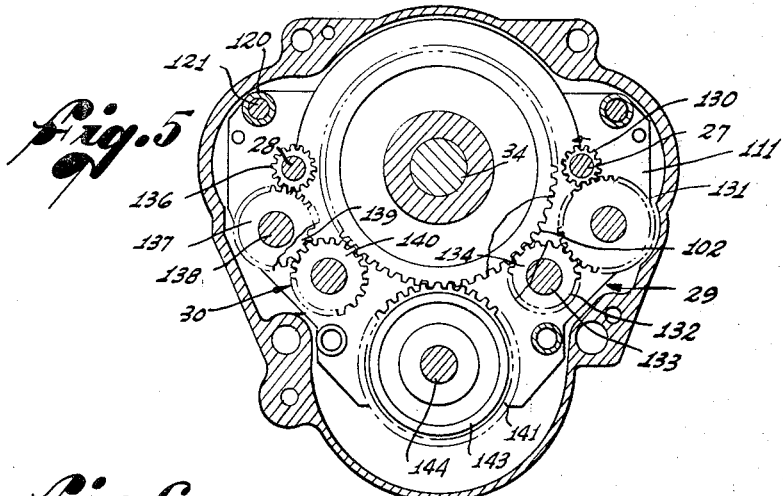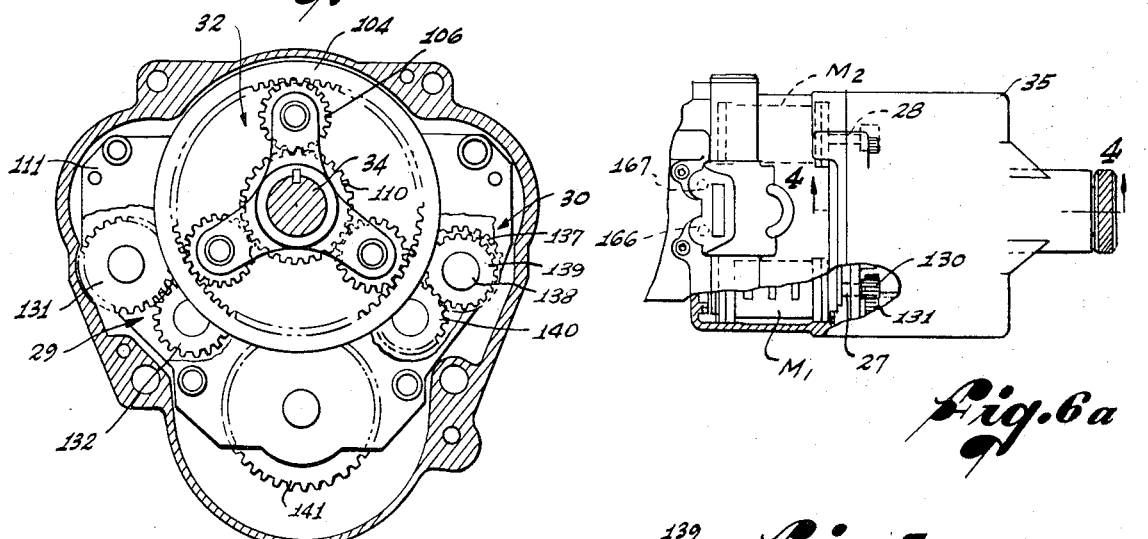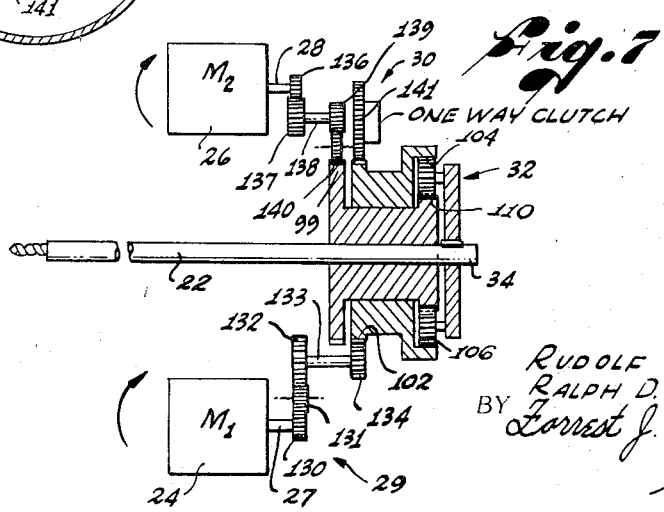

3,526,158
TWO-SPEED POWER TAPER DRILL
Ralph D. Adams, Glendora, and Rudolf R. Schindler, Los Angeles, Calif., assignors to Omark-Winslow Aerospace Tool Co., Portland, Oreg., a corporation of Oregon
Filed July 10, 1968, Ser. No. 743,791
Int. Cl. B23b *45/14*
U.S. Cl. 77—13    10 Claims

ABSTRACT OF THE DISCLOSURE

A power drill for drilling taper holes with provision for drilling at a high rotational speed until the drill bit breaks through the work, and then at a lower rotational speed for taper reaming, the lower speed being conducive to a superior finish. Two motors drive the drill bit enough through a planetary gear set at the high rotational speed while the bit is boring through the work; and means are provided whereby at breakthrough, one of the motors is stopped, and the planetary gear set, then driven solely by the other motor, rotates the bit at the reduced speed. The reduced or low speed rate is such that a chip can be taken by the taper bit, such as cannot be accomplished at the high speed rate, and under this condition a taper hole of superior finish is produced.

BACKGROUND OF THE INVENTION

In taper drilling or reaming in certain metals, notably aluminum, but also in steel, titanium, or others, and particularly at small tapers, as e.g., ¼″ per foot, or even in countersinking, it is found that a superior finish is produced if a low drill rotation speed is used. With a small taper such as ¼″ per foot, the taper drill or reamer, at high rotational speed, acts to "wear" the parent material to produce the taper bore, rather than to cut a chip. A smoother and much superior taper bore is made if a chip is taken.

The illlstrative drill which incorporates the invention is of a type having a drill body mounting an axially fixed rotary drill spindle, and motor means for driving the spindle, together with a work engaging foot which is on a carriage arranged for reciprocation toward and from the drill body, along a line parallel to the spindle. In addition, there is a work clamping means, which is on a clamp carriage reciprocable, parallel with the drill spindle, towards and from the drill body. This clamping means can be either a clamp foot which, by retraction of its carriage from an extended position, with the work engaging foot in engagement with one side of a workpiece, moves toward the work engaging foot, and clamps the workpiece thereagainst. Or the clamp foot can be replaced by an expansive collet which may be projected through a hole already made in the work engaging foot, or to one side thereof, and then caused to expand radially as the clamp carriage moves it toward the work engaging foot. The collet has clamp means thereon which, in the radially expanded position, overlies the front side of the workpiece, and so engages it, and moves and clamps it against the work engaging foot upon retraction of the clamp carriage. In either case, after such clamping is accomplished, the two carriages move in unison, at a slow, regulated feed rate, suitable for drilling, toward or into the drill body, moving the clamped workpiece relatively toward the drill body, while the drill turns on its axis in the drill body without axial translation relative to the drill body. If the workpiece is a fixed plate as is most often the case, these relative actions will occur, but with the drill body and drill spindle moved progressively toward the work, while the drill penetrates the work, and the work engaging foot and clamp means, i.e., clamp foot or expansive clamp collet, remain stationary.

SUMMARY OF THE INVENTION

The invention, in a present preferred embodiment, employs two motors, which can be air motors, though not necessarily so. These motors exert torque jointly through a planetary gear set to drive the drill spindle, and their combined power is sufficient to drive the drill through the workpiece. During such drilling, and before the drill point "breaks through," the point of the drill is drilling a bore of predetermined diameter, and cutting edges along the flutes of the drill shank ream the bore to a predetermined taper. The power of the two motors is used during this part of the operation, and the drilling and reaming operation can proceed at an optimum rate by using such gear reduction between the motors and the drill spindle that a drill rotation speed of the order of say approximately 1,000 r.p.m. is established. This rotational speed can be a little lower, or substantially higher. The axial drill rate in inches per minute is regulated in a conventional manner and remains constant throughout the operation. Once the drill point has broken through and the drill is performing only taper reaming, drilling resistance is very greatly reduced, and a single motor can easily do the job alone, with maintenance of the initial axial feed rate. During drilling to this point, the work engaging foot, and clamp means also, have been approaching (relatively) the drill body, and after breakthrough, the approach becomes sufficiently close that a trip member, carried by the work engaging foot, engages and then trips or moves a device which shuts off one of the two motors. Gear ratios are made such that with this motor stationary, the planetary gear set is then operated by the remaining motor, but at a much reduced speed at the drill spindle. In practice, and with aluminum as the material being drilled, the drill spindle speed is thereby reduced, for example, but without limitation, to say 250 to 350 r.p.m. The one motor is powerful enough, with the reduced load owing to cessation of drilling with the point of the drill, to easily continue rotation of the drill, without reduction of forward feed of penetration, to turn the drill at the reduced r.p.m., i.e., with, for example, a 75 percent reduction in speed. The important point is that at this reduced r.p.m., the flutes of the taper drill, or reamer, can cut a chip from the bore rather than "wearing" in a taper, and that by thus cutting a chip, a smooth superior taper bore is obtained, much improved over that obtainable in high speed reaming. It has been determined that, to assure attainment of a highly superior taper bore, reaming, at reduced speed, with the one motor drive should be continued for an approximate minimum distance equal to one and one-half diameters of the taper bore at the breakthrough point.

The reduced r.p.m. is also helpful in the final cutting of the countersink.

BRIEF DESCRIPTION OF THE DRAWINGS

The invention will be better understood, and certain additional features thereof disclosed and explained, in the course of the following detailed description of an illustrative embodiment thereof, reference for this purpose being had to the accompanying drawings, in which:

FIG. 4 is a longitudinal sectional view taken on line 4—4 of FIG. 6a;

FIG. 5 is a transverse section taken on line 5—5 of FIG. 4;

FIG. 6 is a transverse section taken on line 6—6 of FIG. 4;

FIG. 6a is a top plan view of a portion of the drill body; and

FIG. 7 is a diagrammatic view of the motor, gear and planetary transmission system for driving the drill spindle.

DETAILED DESCRIPTION OF A PREFERRED EMBODIMENT

Figure 1:
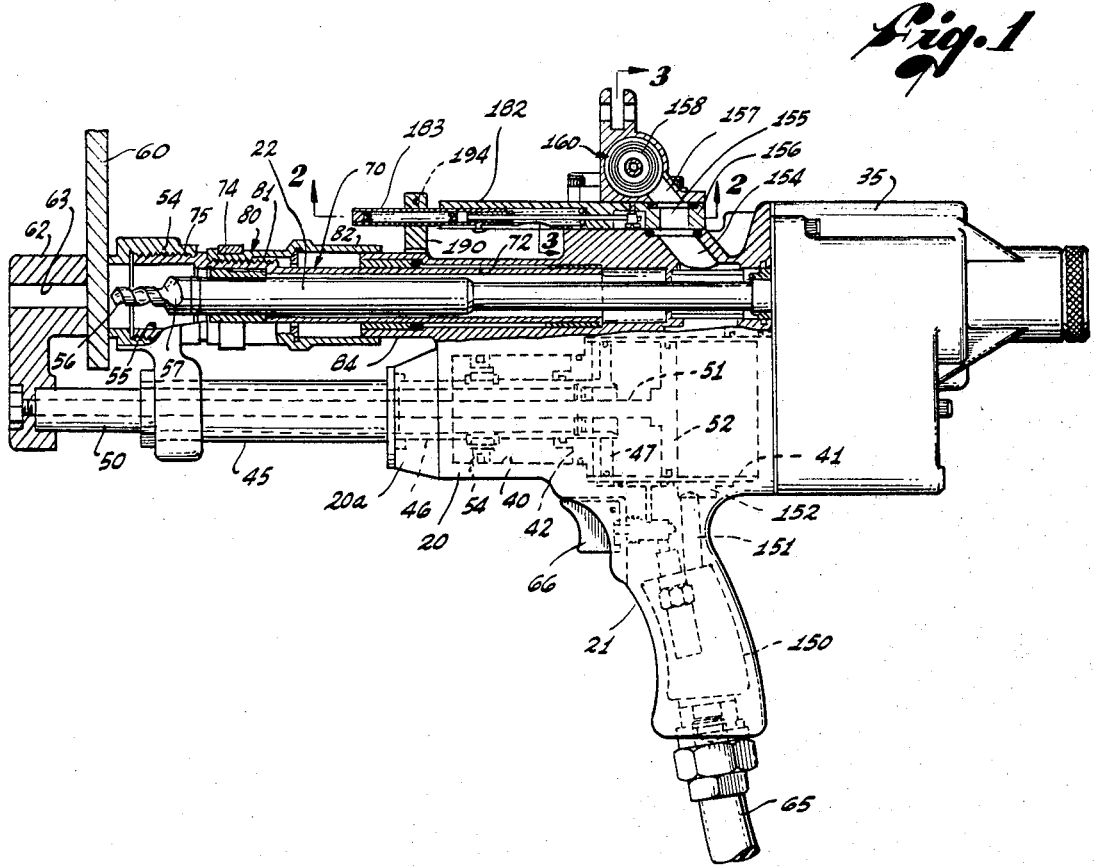
FIG. 1 is a side elevational view, partly in vertical medial section, showing an illustrative embodiment of the invention.

As shown in these figures, the drill comprises an elongated aluminum body 20 formed with a pistol-grip handle 21. The drill spindle is shown at 22, with the two motors, in this case air motors, designated at $M_1$ and $M_2$. These motors are here shown as air motors, though hydraulic motors, or electric motors, could be substituted. The motors $M_1$ and $M_2$ will be seen to be located in the rearward end portion of the body casting 20, and they are on opposite sides of the drill spindle, with their longitudinal axes parallel to the latter. The motors $M_1$ and $M_2$ have rearwardly projecting drive shafts 27 and 28, respectively, and they drive, through gear trains designated generally at 29 and 30, respectively, a planetary gear set or transmission 32, which in turn, drives a drive shaft 34 axially aligned with and coupled to the aforementioned drill spindle 22. A rearward housing 35 is screwed to the rearward end of the body 20, actually forming a part thereof, to house the gear trains 29 and 30 as well as the planetary transmission 32.

Formed in the underside of the body 20, above the pistol-grip handle 21, are a pair of axially aligned cylindrical chambers 40 and 41, disposed parallel to the drill spindle 22, these being separated by a transverse partition 42. These chambers 40 and 41, and the component parts therein, are necessary to the operation of the drill, but form no part of the present invention, and therefore need not be illustrated or described in full detail. A sleeve 45 extends coaxially through body chamber 40 and into chamber 41, and is slidable in a bore 46 in a portion 20a of the body 20, just forwardly of the chamber 40. This sleeve 45 has mounted on its rearward or inner end a piston 47 slidable within the cylindrical chamber 41.

A shaft member 50 is telescopically receivable within the sleeve 45, and includes a rearward part 51 secured to a piston 52 which is slidable within the chamber 41, rearwardly of piston 47.

A piston 54 is mounted on sleeve 45, within chamber 40. The piston 54 has a restricted oil passage therethrough (not shown), and the chamber 40 is filled with oil. During the drilling operation, the piston 54 moves relatively towards the right, as seen in FIG. 1, and the flow of oil in chamber 40 from behind to in front of the piston 54, through this restricted passage, is utilized as a means regulating the feed of the drill, all as more particularly explained in the aforementioned patent. As stated before, the details of these parts and the explanation of their operation is set forth in said patent, and need not be dealt with herein.

On the forward extremity of the sleeve 45, which with its piston functions as a carriage for engaging the work, is a work engaging foot 54. This foot has a bore 55 for receiving the taper drill bit 56, with its countersink 57, and it is adapted, in the area of the bore 55, for flush engagement with the work, here designated by the numeral 60. As here shown, the work 60 comprises a plate which is to be taper drilled and countersunk, and it may be assumed to be composed of aluminum, which is a material offering a problem to the attainment of a superior finish in taper reaming.

A clamp means for clamping the work 60 against the work engaging foot 54 is also provided, and is here designated in a simplified form at 62. Thus, in this instance, it comprises simply a foot fixed on the end of the aforementioned shaft 50 which functions as a carriage for this clamp foot. The clamp foot 62 as here shown is formed with a bore 63 coaxial with the drill to receive the latter as it penetrates the work plate 60 and then projects beyond it for a distance. Instead of the clamp foot, I may use as the clamping means a radially expansive clamp collet, insertable through a previously made hole in the workpiece and which includes clamp fingers engageable with the front side of the work around this hole.

The drill is powered by air, led to it by hose 65 connected to the bottom of its pistol-grip handle 21. Air under pressure conducted into the pistol-grip handle via this hose 65 passes by way of various passageways and valve, unsder the control of a trigger 66, to the chamber 40, 41 and to the air motors, but since analogous valves and passages are fully shown in the aforementioned patent, in a form suitable for use herein, they will not be further illustrated or described in this specification. Suffice it to say that at the beginning of the drilling stroke, the shaft 50 and its piston 47 are near the position shown in FIG. 1, but with the clamp foot 62, carriage 50, and the piston 52 displaced somewhat further toward the left, piston 52 being closely adjacent piston 47. Work engaging foot 50 and clamp foot 62 are thus spaced apart, and the work plate 60 is easily receivable therebetween. The work engaging foot 54 is then placed against the work plate 60, and actuation of trigger 66 causes an operation, through the internal valve mechanism of the drill, to feed air under pressure to the chamber space between the piston 47 and the piston 52. Piston 52 thereupon moves slowly toward the right, bringing clamp foot 62 (or the clamp element of a clamp collet, as the case may be) against the outer or lefthand face of the plate 60, so that the work plate 60 becomes tightly clamped between the work engaging foot 54 and the clamp foot 62 (or collet). Thereafter, equivalently to the operations described in the aforementioned patent, the two pistons 47 and 52 move slowly toward the right in unison, at the predetermined forward feed rate, causing the carriage sleeve 45 and work engaging foot 54, and the carriage shaft 50 and the clamp foot 62, together with the workpiece 60 clamped therebetween, to move slowly and progressively towards the body of the drill, and the workpiece 60 thereby to be engaged and penetrated by the rotating but axially relatively stationary drill bit 56 on the extremity of the drill spindle 22. Often in practice, however, the workpiece 60 is actually stationary, so that after being clamped by the work engaging foot 54 and the clamp foot 62, the drill body 20 slowly moves towards the stationarily held work 60, with the drill bit advancing through the workpiece.

Fixed to and extending rearwardly from work engaging foot 54 is a sleeve 70, which is slidably received in bushings in a bore 72 formed in body 20 concentrically with drill spindle 22, being annularly spaced from the latter, as shown. As here shown, the forward end portion of this sleeve 70 is externally screw-threaded, as at 74 and is screwed into a threaded bore 75 in the foot 54. This sleeve 70 will be seen to be receivable inside the bore 72 as the work engaging foot 54 and the clamp foot 62 move relatively towards drill body 20 in the course of penetration of the drill bit through the work.

An adjustment sleeve 80 has a forward portion screw-threaded onto the screw-threaded section 81 of the sleeve 70, and a rearward somewhat enlarged section 82 which is slidable and rotatable on a forwardly projecting cylindrical portion 84 of the body 20. Cylinder 80 is freely manually rotatable on the screw threads 74 of the sleeve 70, and thus capable of longitudinal adjustment relative to the work engaging head 54 and said sleeve 70. The sleeve 80 is operable in a manner and through means subsequently to be described to shut off one of the drive motors just after breakthrough of the drill, so that the drill bit will thereafter rotate at a substantially reduced r.p.m.

Figure 4:
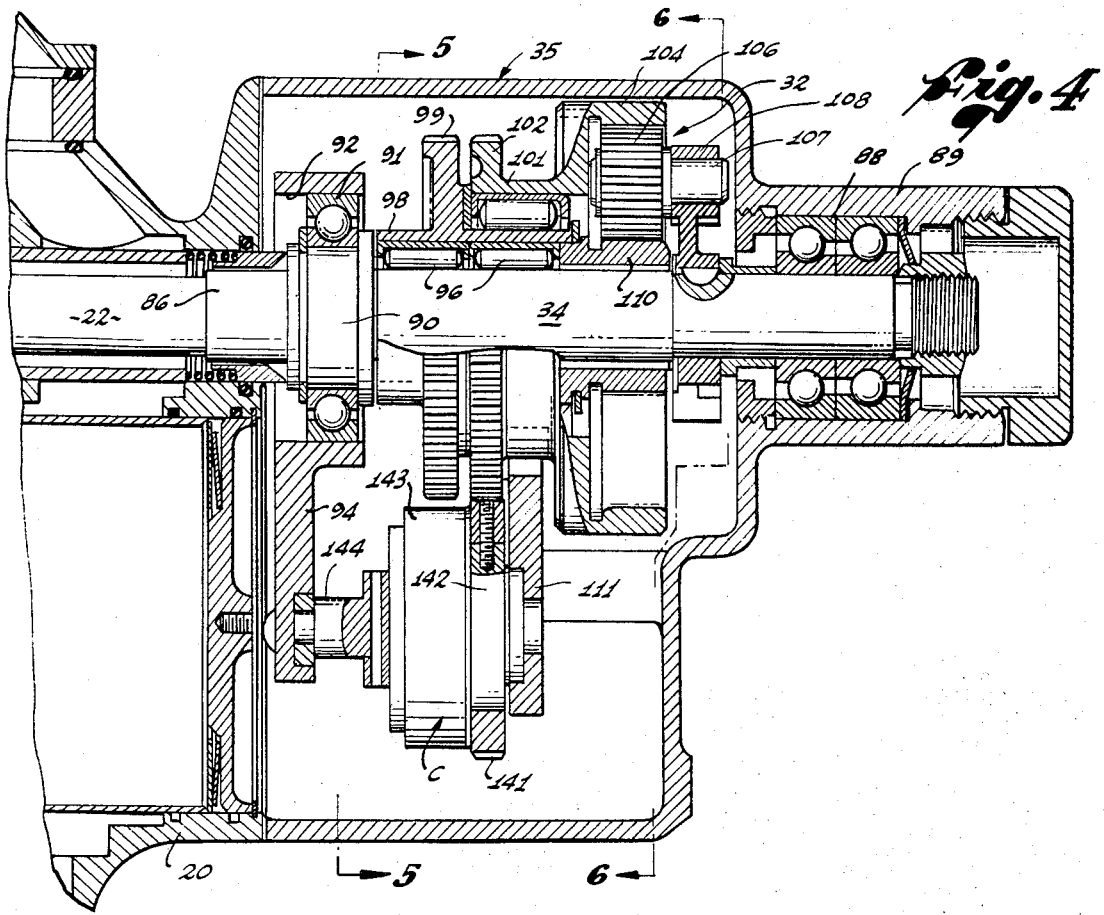

Referring now to FIG. 4, the previously mentioned drill spindle drive shaft 34 is drivingly coupled to spindle 22 by a coupling 86, preferably using external splines on the rearward extremity of the spindle 22, engaging with internal splines in the coupling member 86 on the forward end of the drive shaft 34 (the splines not being shown since they are conventional). The rearward end portion of the drive shaft 34 is journalled in bearings 88 contained within a tubular rearward extension 89 of the housing member 35. Toward its forward extremity, the shaft 34 has an enlarged collar 90 which is journalled in a bearing 91 contained within a bore 92 formed in a transverse frame plate 94 (see also FIG. 6a), and which is to be understood as mounted suitably within the housing extension 35. The drive shafts 27 and 28 extending rearwardly from the motors $M_1$ and $M_2$ go through this frame plate to a pair of presently described gear trains 29 and 30 leading to the planetary gear transmission 32.

Journalled on drive shaft 34 immediately to the rear of bearing 91, as by use of needle bearings 96, is a gear sleeve 98 having thereon a spur gear 99; and journalled on the portion of sleeve 98 to the rear of gear 99 is a gear sleeve 101, which has at its forward end a gear 102, of the same diameter as and immediately to the rear of gear 99. Gear sleeve 102 has at its rearward extremity an internal gear 104, and meshing therewith are a plurality of planet gears 106 rotatable on studs 107 which are set into a planetary cage, spider, or carriage 108 tightly and drivingly mounted on drill spindle drive shaft 34. Planet gears 106 mesh with a sun gear 110 which is on the rearward extremity of gear sleeve 98. It will be seen that if the gears 99 and 102 were to be driven at the same r.p.m., and in the same direction, the internal gear 104 and the sun gear 110 would also rotate at the same r.p.m., the planetary gears 106 would not rotate on their individual axes, and the carriage 108 and drive shaft 34 would likewise turn at the same r.p.m. Thus, no planetary action occurs. Assume now that the internal gear 104 is driven through gear 102 and the gear train between it and motor $M_1$ from said motor at a certain predetermined speed reduction drive ratio, and that the sun gear is driven through its gear 99 and the gear train between it and motor $M_2$ from said motor in the same direction as before but at a predetermined larger speed reduction. The internal gear and now slower rotating sun gear now cause the planetary gears to rotate on their axes, causing the planetary gear carriage to rotate at a lesser r.p.m. than the internal gear. This r.p.m. is the "high" speed rate of the drill spindle.

Now, by stopping motor $M_1$, the internal gear 104 is stopped, and the drill spindle is driven by the planetary gear carriage owing to rotation of sun gear 110, with planetary gears 106 rolling on now stationary internal gear 102. The gear reduction, owing to the now stationary internal gear, is now substantially greater than before, so that the drill spindle now rotates at "slow" speed.

Other forms of planetary or epicyclic gear transmission may of course be used within the broad scope of the invention. Also, the gears of the two gear trains 29 and 30 are capable of selection to afford any desired high and low speed drives of the drill spindle. The internal gear 102 may initially rotate at the same r.p.m. as the sun gear, or even with greater gear reduction. In general, but without implied limitation, a good low speed range for superior taper drilling with a ½" diameter drill is of the order of 250 or 350 r.p.m.; and a good high speed range can be of the order of one to several thousand r.p.m.

Referring now most particularly to FIGS. 5–7, the two gear trains 29 and 30 between motors $M_1$ and $M_2$ and the planetary transmission will next be described. In addition to the transverse frame plate 94 already described as contained and mounted inside the housing part 35, and which is utilized to support bearings for various gear shafts presently to be described, there is a second and somewhat similar frame plate 111 mounted inside the housing part 35, spaced rearwardly of the plate 94, and located immediately to the rear of the gear 102. This frame plate 111, which may serve also to afford bearing for certain gear shafts, is tied to the first-mentioned frame plate 94 by means of spacers 120 and screws 121.

The gear trains between the motors and the two planetary transmission drive gears 99 and 102 are subject to variation and interchange for selection of preferred gear ratios, and those shown are merely illustrative and subject to wide modification. The shafts of the individual gears of these trains may be afforded bearings in any fashion desired, but the frame plate 94 is intended primarily for this purpose, and the frame plate 111, or other fixtures, may also be utilized.

As here shown, on the rearward end of shaft 27 of motor $M_1$, which shaft may be journalled in a suitable bearing carried by frame plate 94, is a gear 130 which meshes with an idler gear 131. The idler gear 131 meshes with a gear 132, which is on a gear shaft 133 extending rearwardly and carrying a gear 134 which meshes with the aforementioned drive gear 102 for the internal gear 104 of the planetary transmission.

The shaft 28 of motor $M_2$, which may be understood to be journalled similarly in the frame plate 94, has at its rearward extremity a gear 136, which meshes with a gear 137. The latter is on a shaft 138, which carries also, in the plane of planetary transmission drive gear 99, a gear 139 meshing with an idler gear 140 which in turn meshes with the planetary transmission drive gear 99.

As shown best in FIG. 4, planetary transmission drive gear 102 meshes at the bottom with a gear 141, which is pinned on the disc-shaped rotary driving member 142 of a one-way clutch indicated generally by the letter C. The stationary outer part or casing 143 of the clutch is pinned to a stud 144 mounted on the frame plate 94. The clutch C may be of any known type capable of permitting free rotation of the gear 130 in the direction of normal rotation of gear 102, but to act as instantaneously a brake against reverse rotation. Such one-way or over-running clutches are common in the art in a number of different forms, and accordingly the details of any particular clutch need not be shown.

The purpose of this one-way clutch is to prevent any possibility of drive of the gear 102 by the motor $M_2$, through a back reaction effect, upon stopping of motor $M_1$.

Figure 3:
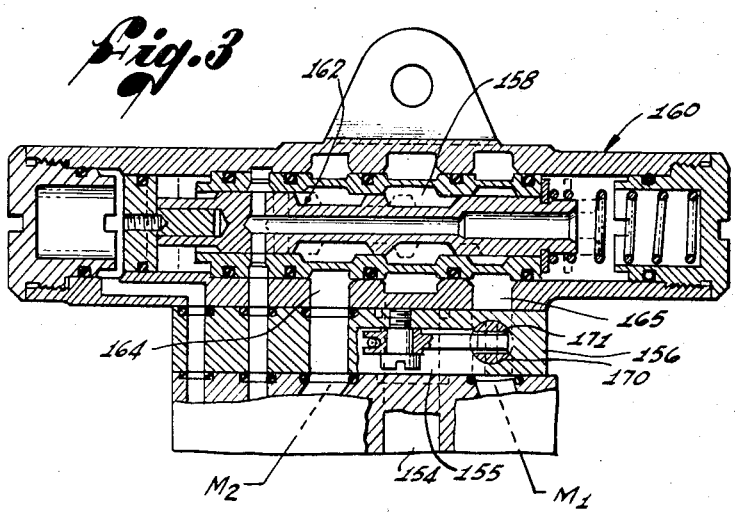
FIG. 3 is a section taken on line 3—3 of FIG. 1.

From what has now been described, it should be understood that as the work engaging foot 54, clamp foot 62, and work 60 move progressively, relatively speaking, toward the drill body, the drill bit 56 will engage and penetrate the work. Air under pressure for the drive of the two motors $M_1$ and $M_2$ enters the pistol-grip handle 21 via hose 65, to a chamber 150, and thence passes through passageway 151 to a circular chamber 152 surrounding the chamber 41, then from the top thereof to passageway 154, a passageway 155 through an intermediate plate 156 (FIG. 3), and finally a passageway 157 leading to a chamber 158 in a slide valve assembly 160. In the position shown in FIG. 3, air in the chamber 158 is cut off. By movement, however, of the slide valve 162 towards the right, as to the position indicated in dashed lines, air from chamber 158 is enabled to pass to and thence through two outlet passages 164 and 165, the former leading to motor $M_2$ and the latter to motor $M_1$. The passageway 164 leads to an inlet passage 166 for motor $M_1$, and the passage 165 leads to an inlet passage 167 for motor $M_2$ (FIG. 6a). The entire continuity of these passages is not shown in the drawings to avoid confusion, but it will be clearly understood that the passage 164 continues to passage 166 and that the latter feeds the inlet to motor $M_2$ while the passage 165 leads to the passage 167 which feeds the inlet to motor $M_2$.

Passage 165, in the portion thereof passing through the aforementioned plate 165, intersects a transverse bore 170 for a valve piston 171. As seen best in FIG. 2, the piston 171 is capable of reciprocation to cover or uncover the air passageway 165 leading to motor $M_1$, being shown in FIG. 2 in the retracted position, in which passageway 165 is open. The piston 171 has a tail part 172, including a cross pin 173 engaged by a fork 174 at the extremity of a lever 175 located in a chamber 176 in said plate 156. The lever 175 is pivoted in said chamber, at 177, with its other arm, which is relatively short, and bifurcated at its extremity, as at 178, straddling a neck portion 179 on the rearward extremity of an actuating rod 180.

Figure 2:
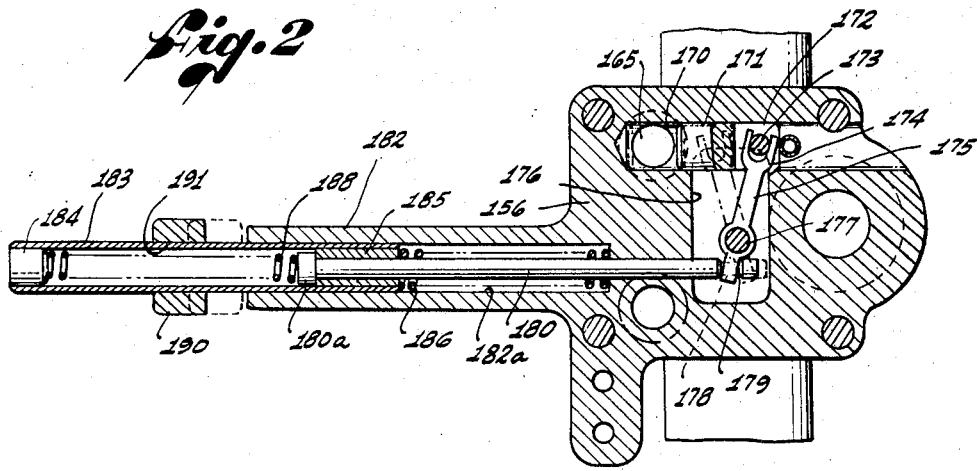
FIG. 2 is a section taken on line 2—2 of FIG. 1.

The actuating rod 180 is reciprocable in a tubular extension 182 of the plate 156 extending parallel with the drill spindle below. The tubular extension or tube 182 has slidably received therein a forwardly projecting tube 183, plugged at its forward extremity as at 184, having fixed in its rearward extremity a bushing 185 forming a stop shoulder for a coil compression spring 186 surrounding the rod 180. The other end of this coil spring engages the inner end of the cylindrical bore 182a of the tubular extension 182, and the spring 186 acts to yieldingly oppose movement towards the right of the tubular member 183 from the position shown in FIG. 2 and serves also as a return spring to act toward the left on the tubular member 183 to return the parts to the full line position of FIG. 2 when the latter is released by the presently described actuating mechanism. The forward extremity of the actuating rod 180, forwardly of bushing 185, has a collar 180a engaging one end of a strong override spring 188, whose other end engages plug 184 in the forward extremity of tube 183. Normally, then, i.e., during drilling at high r.p.m., the parts are positioned as indicated in FIG. 2. To stop operation of motor $M_1$, and thus reduce the drill rotation speed to that appropriate for taper reaming, the tube 183 mounts a depending finger clamped thereon in a selected longitudinal position. This finger 190 is engaged and moved to stop motor $M_1$ by the rearward extremity of tube 80 projecting rearwardly from the work engaging foot 54 after the drill has broken through the workpiece. The finger 190 will be seen to have a bore 191 therethrough which receives the tube 183, and can be clamped thereto in nicely adjusted position by clamp screw 194.

In the position of FIG. 1, before drilling has started, the rearward extemity of the actuating or trip sleeve 80 may, as here shown, be short of the finger 190 by a distance slightly greater than the thickness of the workpiece. The adjustment of the position of finger 190 is so made that the actual clearance distance between the rearward extremity of the sleeve 80 and the finger 190 is such that the drill will break through the workpiece prior to stoppage of motor $M_1$ by the trip mechanism, taking into account that the finger 80 and tube 183 must be moved a short distance to stop motor $M_1$ (now to be further described). Assuming then that the finger 190 has been engaged by the trip sleeve 80, and then moved inwardly, the tubular member 183 will thereby be moved inwardly, and spring 188 being stronger than spring 186, the rod 180 will be moved inwardly against spring 186. This proceeds until lever 175 is switched from the position shown in full lines in FIG. 2 to the position shown in dotted lines therein, at which time the valve closure piston 171 has moved across and blocked the air passage 165 leading to motor $M_1$.

Motor $M_1$ accordingly stops, and the planetary transmission thereupon behaves automatically as heretobefore described to drop the speed of spindle rotation to the predetermined "slow speed" rate, desired for the final taper reaming operation to provide a superior finish to the walls of the taper bore. Drilling continues at this slow speed rate until the drill bit has reamed for a distance equal, preferably, to substantially at least one and one-half diameters of the drill bit at the forward extremity or breakthrough point. Thereafter, the countersink 57 can cut a countersink into the work, still at "low speed." Once the rod 18 has shifted the lever 175 to completely stop motor $M_1$, this rod may come to a stop against a wall of chamber 176, and tube 183 can continue its movement into member 182 by compression of spring 188. The other drill motor $M_2$ can be stopped at the end of the countersinking operation by automatic stop means such as shown in Pat. No. 2,909,949.

From the foregoing description, it will be seen that the drill of the invention assures the drilling of a superior taper bore, or taper bore followed by a countersink, and does so both automatically and unfailingly. The operator need only apply the drill to the work in the conventional fashion, and upon breakthrough of the drill point, operations take place automatically which stop one of the drive motors (which is permissible since now drilling resistance is greatly reduced) while the other drive motor then operates with a large gear reduction to rotate the drill during the reaming operation at a materially reduced speed of rotation best adapted for cutting a chip, such as will assure attainment of a smooth, superior finish in the taper bore.

We claim:

1. In a two-speed power drill having a taper drill bit for drilling and taper reaming a taper bore through a workpiece,
    a drill body,
    a drill spindle journalled and supported against axial movement in said body, said drill spindle being adapted for mounting said taper drill bit at the forward extremity thereof,
    a foot for engagement with a workpiece, said foot located forwardly of said body, and a carriage for said foot movable on said body parallel to said spindle through a drilling stroke between a position extended from said body, with the point of the drill bit positioned behind the workpiece engaged by said foot, and a position retracted relatively to said body in which the foot remains engaged with the workpiece and the drill bit has drilled through and beyond the workpiece,
    two independent motors on said body for powering said drill spindle and an output speed reduction gear means driven by each of said motors,
    motor control means on said body adapted for actuation to reduce the rate of rotation of one of said motors relative to the other,
    a planetary gear transmission having two relatively rotatable gears, one driven by the output speed reduction gear means of one of said motors and the other by the output speed reduction gear means of the other of said motors,
    and a rotatable planetary gear carriage with planetary gears thereon meshing with both of said gears,
    means coupling said rotatable planetary gear carriage to said drill spindle, and
    means operative after breakthrough of the drill through the workpiece for actuating said motor control means.

2. In a two-speed power drill having a taper drill bit for drilling and taper reaming a taper bore through a workpiece,
    a drill body,
    a drill spindle journalled and supported against axial movement in said body, said drill spindle being adapted for mounting said taper drill bit at the forward extremity thereof,
    a foot for engagement with a workpiece, said foot located forwardly of said body, and a carriage for said foot movable on said body parallel to said spindle through a drilling stroke between a position extended from said body, with the point of the drill bit positioned behind the workpiece engaged by said foot, and a position retracted relatively to said body in which the foot remains engaged with the workpiece and the drill bit has drilled through and beyond the workpiece, two independent motors on said body for powering said drill spindle and an output speed reduction gear means driven by each of said motors, stop means on said body adapted for actuation to stop one of said motors independently of the other, a planetary gear transmission having two relatively rotatable gears, one driven by the output speed reduction gear means of one of said motors and the other by the output speed reduction gear means of the other of said motors, and a rotatable planetary gear carriage with planetary gears thereon meshing with both of said gears, means coupling said rotatable planetary gear carriage to said drill spindle, and actuating means on said foot for actuating said stop means at an intermediate point in said drilling stroke following breakthrough of the drill bit through the workpiece.

3. The subject matter of claim 2, wherein said gears of said planetary transmission comprise coaxial internal and sun gears, with said planetary gears therebetween and meshing therewith, and a carriage, rotatable on the axis of said internal and sun gears, rotatably mounting said planetary gears, said output gear means of said motors being arranged to drive said internal and sun gears in the same direction of rotation, and the motor stopped by said stop means being the motor which drives said internal gear, and means preventing reverse rotation of said internal gear.

4. The subject matter of claim 3, including also means preventing reverse rotation of said internal gear.

5. The subject matter of claim 3, wherein the two motor means and the corresponding output speed reduction gear means thereof are adapted to drive said sun gear of said planetary transmission with a greater speed reduction than said internal gear thereof.

6. The subject matter of claim 2, wherein said actuating means comprises a member engageable with said stop means, said stop means including a yieldable member spring actuated to a normal position and movable therefrom by said actuating means, and means responsive to said movement for interrupting power to said motor.

7. The subject matter of claim 6, wherein said actuating means is adjustable to determine the point at which it effects stoppage of said stop means.

8. The subject matter of claim 7, wherein said actuating means comprises a member screw-threaded for adjustment movement longitudinally of the drill spindle on said work engaging foot.

9. The subject matter of claim 6, wherein said stop means includes a longitudinally shiftable tube slidable in a bore in said drill body, an abutment on said tube engageable by said actuating means, a sleeve fixed in the rearward portion of said tube, an actuating rod slidable in said sleeve having on its forward extremity a hand engageable with said sleeve, a compression spring in said tube acting between said head and forward end portion of said tube, and a compression spring in said bore in said body acting between said body and the rearward end position of said tube, said means for interrupting power to said motor comprising said actuating rod.

10. In a two-speed power drill having a taper drill bit for drilling and taper reaming a taper bore through a workpiece, a drill body, a drill spindle journalled in said body, motor means on said body rotating said drill spindle comprising two independent motors and output speed reduction gear means driven thereby, stop means on said body adapted for actuation to stop one of said motors independently of the other, a planetary gear transmission having two relatively rotatable gears, one driven by the output gear means of one of said motors and the other by the output speed reduction gear means of the other of said motors, and a rotatable planetary gear carriage with planetary gears thereon meshing with both of said gears, means coupling said rotatable planetary gear carriage to said drill spindle, and means operative after breakthrough of the drill through the workpiece for actuating said stop means for said motor.

References Cited
UNITED STATES PATENTS

| 2,366,646 | 1/1945 | Orr | 74—675 |
| 2,436,936 | 3/1948 | Page | 74—675 XR |
| 2,909,949 | 10/1959 | Winslow | 77—13 |

FRANCIS S. HUSAR, Primary Examiner

U.S. Cl. X.R.

74—675; 77—32.1, 33.5